United States Patent
Kiselev (10) Patent No.: US 7,149,858 B1
(45) Date of Patent: Dec. 12, 2006

(54) SYNCHRONOUS REPLICATION FOR SYSTEM AND DATA SECURITY

(75) Inventor: Oleg Kiselev, Palo Alto, CA (US)

(73) Assignee: Veritas Operating Corporation, Mountain View, CA (US)

( * ) Notice: Subject to any disclaimer, the term of this patent is extended or adjusted under 35 U.S.C. 154(b) by 326 days.

(21) Appl. No.: 10/699,475

(22) Filed: Oct. 31, 2003

(51) Int. Cl.
G06F 12/14 (2006.01)
(52) U.S. Cl. .................. 711/162; 711/163; 714/6
(58) Field of Classification Search ............ 711/161, 711/162
See application file for complete search history.

(56) References Cited

U.S. PATENT DOCUMENTS

| | | | |
|---|---|---|---|
| 5,742,792 A * | 4/1998 | Yanai et al. ............ | 711/162 |
| 6,691,245 B1 * | 2/2004 | DeKoning ............ | 714/6 |
| 2003/0158834 A1 * | 8/2003 | Sawdon et al. ........ | 707/1 |
| 2004/0059869 A1 * | 3/2004 | Orsley ............ | 711/114 |
| 2004/0205312 A1 * | 10/2004 | Zlotnick et al. ........ | 711/162 |
| 2005/0193034 A1 * | 9/2005 | Kitsuregawa et al. ... | 707/202 |

* cited by examiner

*Primary Examiner*—B. James Peikari
(74) *Attorney, Agent, or Firm*—Campbell Stephenson Ascolese LLP (57) ABSTRACT

A method, system, and computer-readable medium for maintaining up-to-date, consistent backup copies of primary data that are immune to corruption even when security of the primary data is breached. Independent security domains are established for primary and secondary data, such that access to each security domain must be obtained independently of access to the other security domains. For example, a host computer system having access to data storage in the primary security domain does not have access to data storage in the secondary security domain, and vice versa. Changes to primary data are synchronously replicated over a tightly controlled replication link from primary data storage in the primary security domain to secondary data storage in the secondary security domain. A change to the data is completed in the primary security domain when an acknowledgement is received that the change to the data has been stored in secondary data storage.

53 Claims, 6 Drawing Sheets

*System Structure*
*FIG. 1A*

FIG. 2
Overlay Snapshot

SYNCHRONOUS REPLICATION FOR SYSTEM AND DATA SECURITY

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

Information drives business. For businesses that increasingly depend on data and information for their day-to-day operations, unplanned downtime due to data loss or data corruption can hurt their reputations and bottom lines. Data corruption and loss can occur when software or equipment malfunctions, when administrators make mistakes, and when systems and data are deliberately attacked.

Deliberate attacks on systems and data can be made by hackers exploiting security flaws, by disgruntled employees settling scores, and even by deliberate industrial sabotage. The FBI reports that millions of dollars are lost each year as a result of attacks by intruders and software programs such as viruses and worms. In the "2003 Computer Crimes and Security Survey" of 530 corporations, each successful attack cost corporations an average of $2.7 million in theft of proprietary information. The losses include lost data, employee time used in recovering data, delays in existing projects, and damage to equipment. Of the companies surveyed, 35% reported denial-of-service attacks, 36% reported infiltration and vandalism attacks, 6% reported theft of transaction information, 4% reported financial fraud, and 19% reported other types of attacks and misuse.

Businesses are becoming increasingly aware of the costs imposed by data corruption and loss and are taking measures to plan for and recover from such events. Often these measures include making backup copies of primary, or production, data, which is 'live' data used for operation of the business. Backup copies of primary data are made on different physical storage devices, and often at remote locations, to ensure that a version of the primary data is consistently and continuously available.

Backup copies of data are preferably updated as often as possible so that the copies can be used in the event that primary data are corrupted, lost, or otherwise need to be restored. One way to achieve consistency and avoid data loss is to ensure that every update made to the primary data is also made to the backup copy, preferably in real time. Often such "duplicate" updates are made on one or more "mirror" copies of the primary data by the same application program that manages the primary data. Maintaining one or more mirrored copies of the primary data requires the allocation of additional storage space to store each mirrored copy. In addition, maintaining mirrored copies requires processing resources of the application and the computer system hosting the application (often referred to as a host or node) to make each update to the primary data multiple times, once for each mirrored copy. Mirrored copies of the data are typically maintained on devices attached to or immediately accessible by the primary node to avoid delays inherent in transferring data across a network or other communication link to a secondary node and processing the data at the secondary node.

In addition to maintaining mirrored copies of primary data locally, primary data are often replicated to remote sites across a network. A copy of the primary data is made and stored at a remote location, and the replica is updated by propagating any changes to the primary data to the backup copy. If the primary data are replicated at different sites, and if the failure of the systems storing the data at one site is unlikely to cause the failure of the corresponding systems at another site, replication can provide increased data reliability. Thus, if a disaster occurs at one site, an application that uses that data can be restarted using a replicated copy of the data at another site.

Replication of data can be performed synchronously or asynchronously. With synchronous replication, an update is posted to the secondary node and acknowledged to the primary node before completing the update at the primary node. In the event of a disaster at the primary node, data can be recovered from the secondary node without loss because the copies of the data at the primary and secondary nodes contain the same data.

With asynchronous replication, updates to data are immediately reflected at the primary node and are persistently queued to be forwarded to each secondary node. Data at the secondary node therefore lags behind data at the primary node. Asynchronous replication enables application programs to process data more quickly, as no delay is incurred waiting for secondary nodes to receive changes to data and acknowledge their receipt. Upon failure of the primary node, however, the secondary nodes cannot be assumed to have an up-to-date version of the primary data. A decision regarding whether to replicate data synchronously or asynchronously depends upon the nature of the application program using the data as well as numerous other factors, such as available bandwidth, network round-trip time, the number of participating servers, and the amount of data to be replicated.

Even in a protection scheme including both mirroring and replication of primary data, primary data are not completely safe from corruption. For example, a breach of security of the primary node typically will enable an attacker to access and corrupt all resources accessible from the primary node, including the mirrored copies of data. Furthermore, when primary data are corrupted and the result of the update corrupting the primary data is replicated to secondary nodes hosting backup copies of the data, all copies of the data are corrupted. "Backing out" the corrupted data and restoring the primary data to a previous state is required on every copy of the data that has been made.

Previously, this problem has been solved by restoring the primary data from a "snapshot" copy of the data made before the primary data were corrupted. Once the primary data are restored, the entire set of primary data is copied to each backup copy to ensure consistency between the primary data and backup copies. Only then can normal operations, such as updates and replication, of the primary data resume. When terabytes of primary data are involved, the restoration process is lengthy and the downtime to businesses is very expensive.

What is needed is the ability to maintain consistent, up-to-date copies of primary data that are protected from corruption and that enable quick resumption of operations upon discovery of corruption of the primary data or failure of the primary node.

SUMMARY OF THE INVENTION

The present invention provides the ability to maintain up-to-date, consistent backup copies of primary data that are immune to corruption even when security of the primary data is breached. Independent security domains are established for primary and secondary data, such that access to each security domain must be obtained independently of access to the other security domain. For example, a host computer system having access to data storage in the primary security domain does not have access to data storage in the secondary security domain, and vice versa. Changes to primary data are synchronously replicated over a tightly controlled replication link from primary data storage in the primary security domain to secondary data storage in the secondary security domain. A change to the data is completed in the primary security domain when an acknowledgement is received that the change to the data has been received in the secondary data storage, thus ensuring consistency between the primary and secondary data storage.

Other than via the tightly controlled replication link, the secondary data storage is not directly accessible from the primary node and thus is not directly subject to corruption should a breach occur in the primary security domain. The secondary data storage stores previous versions of data from which valid data can be recovered if primary data are corrupted and replicated to the secondary node. The secondary data storage can be used to resume operations with an up-to-date, consistent version of the primary data upon failure of the primary node and provides consistent data for recovery when both primary and secondary data are corrupted.

In one embodiment, a method includes replicating a change to data from first data storage in a first security domain to second data storage in a second security domain. The first and second security domains are independent of each other. The method further includes completing the change to the data in the first security domain when an acknowledgement is received that the change to the data has been stored in the second data storage. For example, completing the change to the data can include notifying an application making the change to the data that the change is completed. A host in the first security domain can access data in the second security domain by requesting the data from a second host in the second security domain. The data can be read from the secondary data storage when the primary data storage fails. Upon discovering corruption of a portion of the primary data, the corrupted portion of the data can be read from the secondary data storage and the uncorrupted portion of the data can be read from the primary data storage. The secondary data storage can be configured to store previous versions of the data from which data can be restored.

BRIEF DESCRIPTION OF THE DRAWINGS

The present invention may be better understood, and its numerous objectives, features, and advantages made apparent to those skilled in the art by referencing the accompanying drawings.

The use of the same reference symbols in different drawings indicates similar or identical items.

DETAILED DESCRIPTION

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Terminology

The terms "consistent" and "consistency" are used herein to describe a backup copy of primary data that is either an exact copy of the primary data or an exact copy of primary data as the primary data existed at a previous point in time. The terms "write operation" and "update operation" are used interchangeably to describe making a change to data. The term "change" when used with reference to data includes adding new data as well as updating existing data.

Data storage may take form as groups of one or more physical devices, such as one or more dynamic or static random access storage devices, one or more magnetic or optical data storage disks, or one or more other types of storage devices. With respect to backup copies of primary data, preferably the backup storage devices are direct access storage devices such as disks rather than sequential access storage devices such as tapes. Because disks are often grouped to form a logical storage volume that is used to store backup copies of primary data, the terms "storage" and "data storage" are used interchangeably herein with "storage volume;" however, one of skill in the art will recognize that the systems and processes described herein are also applicable to other types of storage and that the use of the term "storage volume" is not intended to be limiting. A storage volume storing the primary data is referred to herein as a primary volume, and a storage volume storing a backup copy of the primary data is referred to herein as a backup volume, secondary volume, or remote volume. A storage volume storing a snapshot of data is referred to herein as a snapshot volume.

The terms "host" and "node" are used interchangeably to describe computer systems, which are described in the discussion of FIG. 4 below. A node in a network managing the primary data/volume is referred to herein as a primary node, and a node in the network maintaining backup copies of the primary data but not the primary data itself is referred to herein as a secondary, backup, or remote node.

Introduction

The present invention provides the ability to maintain up-to-date, consistent backup copies of primary data that are immune to corruption even when security of the primary data is breached. Independent security domains are established for primary and secondary data, such that a host computer system in the primary security domain does not have direct access to data storage in the secondary security domain, and vice versa. Access to the independent security domains can be controlled by software running on respective hosts in each security domain.

Backup copies of the primary data in one security domain are maintained by synchronously replicating each update to the primary data to a backup copy stored in a different security domain. The replication is performed over a tightly controlled communication link, and the backup copies are inaccessible directly from within the first security domain. Independently-obtained access to the second security domain is required to use or update the backup copies of the data. The backup copies of the data in the second security domain are configured to preserve previous states of the primary data such that the primary data can be restored to a valid state that existed at a previous point in time in the event that primary data are corrupted and replicated to the secondary node.

System Structure

Figure 1A:
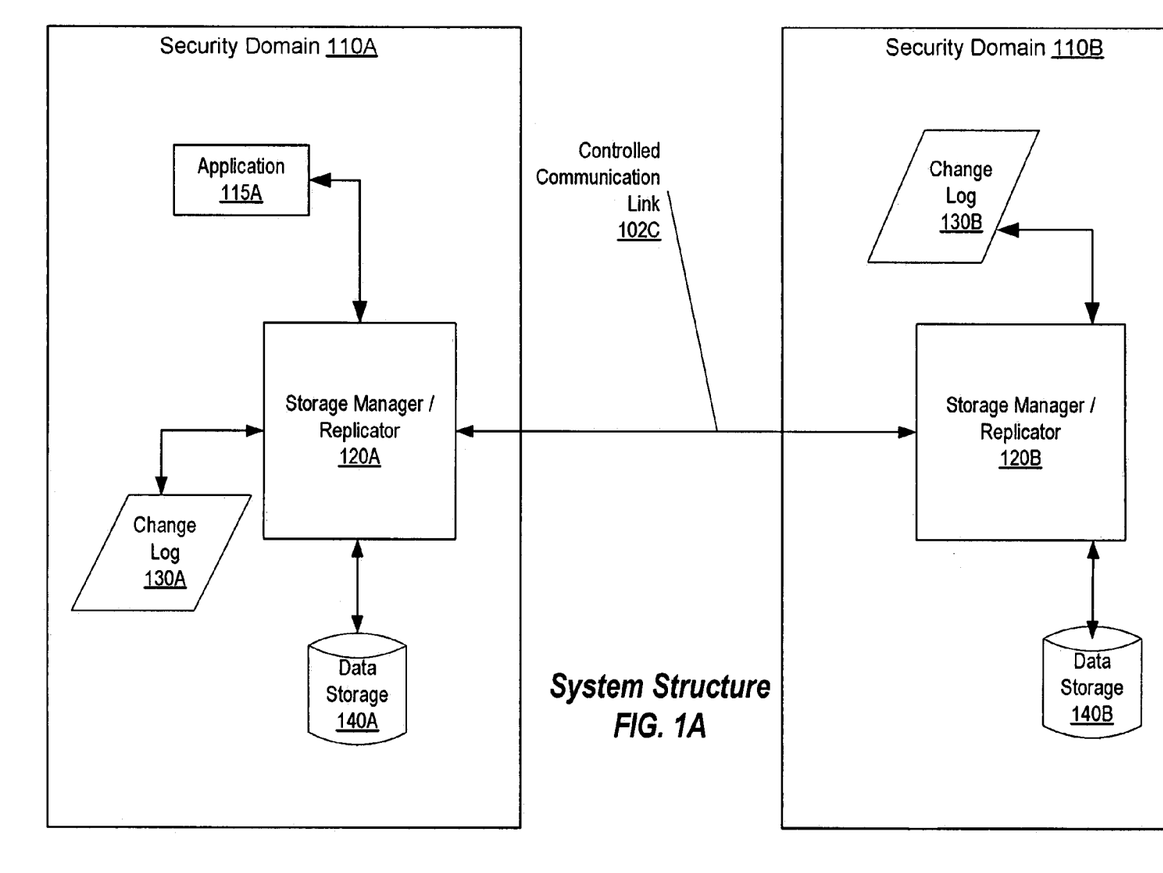
FIG. 1A shows an example of a system configured to operate in accordance with the present invention.

FIG. 1A shows an example of a system configured to operate in accordance with the present invention. Two separate security domains are shown, security domains 110A and 110B. Access to security domains 110A and 110B is obtained independently, such that obtaining access to security domain 110A does not provide access to security domain 110B, and vice versa. Access to security domains 110A and 110B can be controlled, for example, by software running on respective host computer systems (not shown) in each security domain.

Software programs application 115A and storage manager/replicator 120A operate within security domain 110A. Application 115A manages primary data that can be stored in change log 130A and data storage 140A. Change log 130A can be considered to be a "staging area" to which changes to data are written before being written to data storage. Change logs such as change log 130A, also referred to simply as logs, are known in the art and can be implemented in several different ways; for example, an entry in the log may represent an operation to be performed on a specified region of the data. Alternatively, the log may be structured to maintain a set of operations with respect to each region. Other types of log structure are also possible, and no particular type of implementation of change logs is required for operation of the invention. Storage manager/replicator 120A intercepts write operations to primary data by application 115A and replicates changes to the primary data to security domain 110B.

While application 115A and storage manager/replicator 120A may run on one or more computer systems (not shown) in security domain 110A, the hardware configuration of security domain 110A may vary. Application 115A and storage manager/replicator 120A may run on the same or different computer systems, change log 130A may be stored in non-persistent or persistent data storage, and data storage 140A is a logical representation of a set of data stored on a logical storage device which may include one or more physical storage devices.

Secondary data storage 140B is physically and logically isolated from primary data storage 140A. Storage manager/replicator 120A in security domain 110A communicates over controlled communication link 102C with storage manager/replicator 120B in security domain 110B. Security domain 110B also includes a change log 130B and data storage 140B for storing a replica of the primary data, and similar variations in hardware configuration of security domain 110B are possible. The system structure is designed such that controlled communication link 102C can be configured to allow access only by storage managers/replicators 120A and 120B and not by application 115A or other processes running within security domains 110A and 110B. Access accounts for the primary and remote host computer systems (not shown) should be configured with different passwords, particularly system management and privileged accounts. Because storage manager/replicator 120A is configured to intercept write operations by application 115A to primary data and to replicate the changed data, changes to primary data made as a result of performing other destructive actions not involving application 115A (such as reformatting disks in data storage 140A) may not be replicated.

As additional security features, the system is designed such that controlled communication link 102C can be configured to be the only communication link between security domains 110A and 110B. The system can also be configured such that only data conforming to protocols used by storage managers/replicators 120A and 120B are transmitted across controlled communication link 102C. When primary and secondary data storage 140A and 140B are connected via a Storage Area Network (SAN, not shown), the system can be configured to implement the primary and secondary data storage 140A and 140B as portions of two different physical networks to provide an additional security barrier.

Usually, when the focus of replication is on high availability and disaster resiliency, inaccessibility of secondary data by the primary node can be considered to be a problem to overcome. Normally, a primary node can access all mirrored copies of the primary data, and inaccessible secondary data means that read operations must be performed on the primary data itself (or on a copy of the data at the primary node). When considered from the point of view of data security, however, inaccessibility of secondary data by the primary node provides an additional security barrier to protect backup copies of the data from corruption. If the primary data are compromised by a malicious intruder, administrator mistake, or malfunctioning software or hardware, only locally accessible storage is directly jeopardized. To also corrupt the backup data, the additional security barrier must be overcome and the destructive actions corrupting the data must be repeated.

Mirroring Using Synchronous Replication to a Secondary Node

As described with reference to FIG. 1A, up-to-date, consistent backup copies of primary data are maintained that are immune to corruption even when security of the primary data is breached. A copy of primary data storage in one security domain is made in another security domain. Changes to primary data are synchronously replicated over a tightly controlled replication link from the primary data storage to the secondary data storage in the other security domain.

Figure 1B:
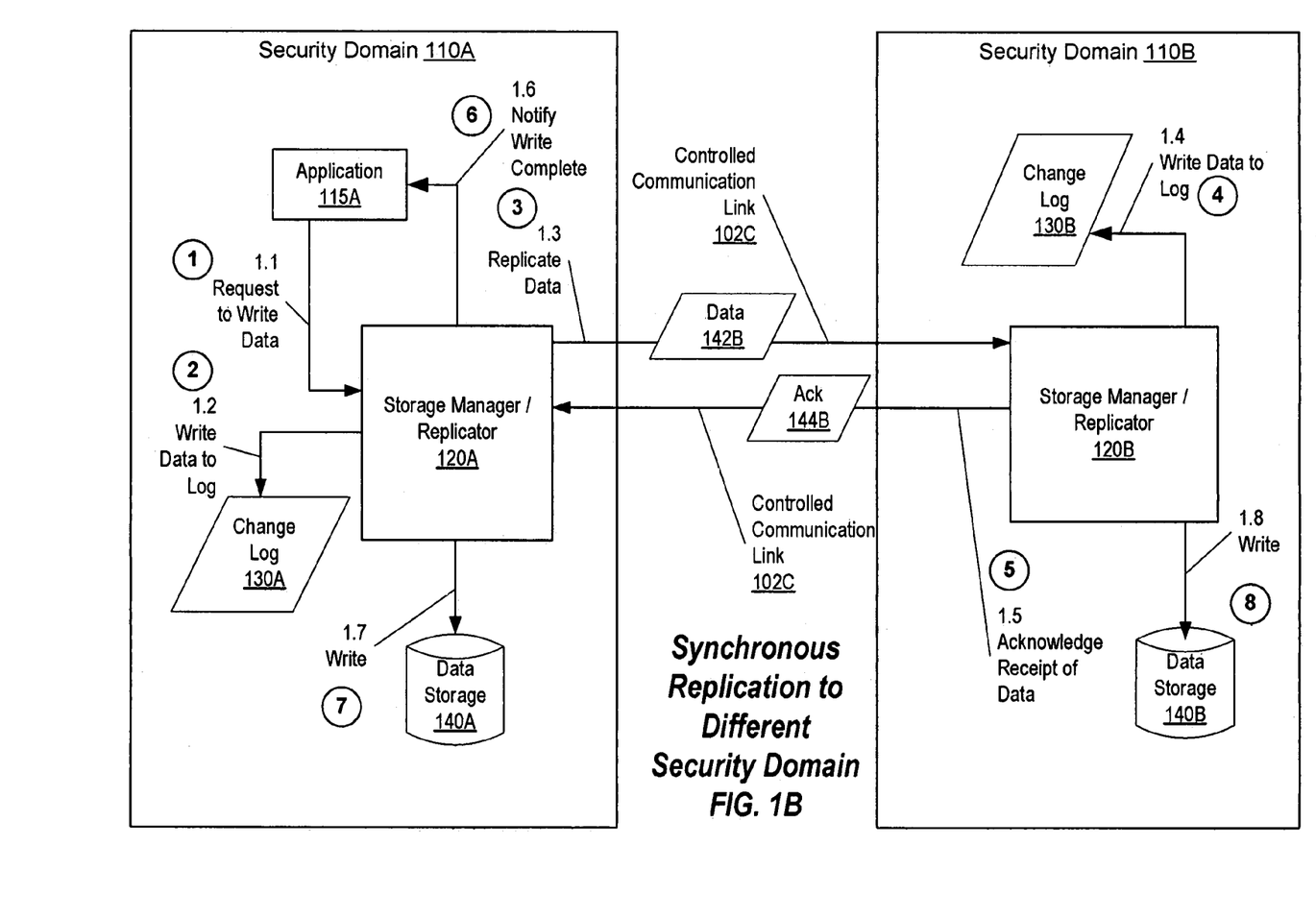
FIG. 1B shows an example of a data flow in performing synchronous replication in the example system of FIG. 1A.

FIG. 1B shows an example of a data flow in performing synchronous replication in the system of FIG. 1A. Encircled guide numbers show the order of the actions in the data flow. In action 1.1, application 115A requests to write primary data. Writing primary data may include adding new primary data or changing existing primary data. In action 1.2, storage manager/replicator 120A writes the data to change log 130A. In this example, change log 130A is persistent data storage, so that even though the data written are not yet written to data storage 140A, the data are persistently stored in security domain 110A. In action 1.3, storage manager/replicator 120A replicates the data written (shown as data 142B) via controlled communication link 102C to storage manager/replicator 120B. Actions 1.2 and 1.3 need not occur in any particular order and are preferably performed simultaneously.

In action 1.4, storage manager/replicator 120B writes the data received to change log 130B, which is also persistent data storage. Once the data are persistently stored in security domain 110B, in action 1.5, storage manager/replicator 120B acknowledges receipt of the data by sending acknowledgement ("ack") 144B via communication link 102C to storage manager/replicator 120A. In action 1.6, having received an acknowledgement that the data are persistently stored in security domain 10B, in action 1.6, storage manager/replicator 120A notifies application 115A that the write operation is complete.

In action 1.7, storage manager/replicator 120A asynchronously writes the data from change log 130A to data storage 140A, and in action 1.8, storage manager/replicator 120B asynchronously writes the data from change log 130B to data storage 140B. The write operation of action 1.7 can occur at any point in time after action 1.2, the write operation of the same data to change log 130A. Completion of the write operation to data storage 140A is not necessary to notify application 115A that the write operation is complete. Similarly, action 1.8, writing the data to data storage 140B can be performed at any time after action 1.4, writing the data to change log 130B.

A change to the data is signaled to be complete when an acknowledgement is received that the change to the data has been received in the secondary data storage, thus ensuring consistency between the primary and secondary data storage. Upon failure of the primary node, the application maintaining the primary data can be started on a secondary node. As a result of the synchronous replication, a replica of the primary data on the secondary node is up-to-date and consistent with the state of the primary data at all times, including immediately prior to failure of the primary node should failure occur. The secondary data can be immediately used to resume operation.

Synchronous replication semantics require that data on the remote secondary node be in the exactly same state as the data on the primary node, persistently stored in both locations. This requirement enables synchronous replication to serve as a substitute for local mirroring, which preserves the same state of data on any two mirrors as of the time the write operation completes and provides accessibility to the consistent, up-to-date data upon restarting a node after failure.

Performance of Synchronous Replication

One of the disadvantages of synchronous replication to a remote node when compared to local mirroring is the additional time required for transfer of data and an acknowledgement of receipt of the data between the primary and secondary nodes before an update operation can be completed. However, advances in networking technology have reduced the time necessary for such transfers.

For example, modern Ethernet, fibre channel and other networking technologies operate at one gigabit per second and higher data transfer rates. These high-speed networking components have become commonplace and are now a standard feature on moderately-priced personal computer motherboards. An example configuration for a computer system including similar networking components is described in further detail below with reference to FIG. 4. With a capacity of close to 125 megabytes per second of data if it were possible to use 100% of the bandwidth, these high-speed networking components provide similar capacity to that of the Small Computer Systems Interface (SCSI) used to directly connect computer systems to peripherals, also described with reference to FIG. 4.

The bandwidth of the modern SCSI bus is approximately 160 megabytes per second. However, the bandwidth of the individual disks attached to the SCSI bus is lower, on the order of 40–50 megabytes per second. Software programs can gain the full bandwidth of a SCSI bus for large input/output operations by writing different portions of the data across disks on the SCSI bus (a process referred to as "striping the data"); therefore, writing to three or four disks in parallel can take advantage of the 160 megabyte per second bandwidth of a modem SCSI bus. These increases in throughput are limited by the bandwidth of the system bus of the host computer system doing the I/O.

The operations of transferring a large amount of data over the replication link, writing the data to remote data storage, and receiving an acknowledgement can be implemented with only slight degradation in latency when compared to the latency of writing the same large amount of data to local data storage.

The average time for the disk to rotate to a given location on the disk and for the disk's write head to "seek" the correct track of the disk at that location is independent of the amount of data being written in an I/O operation. Disk rotation and seek latency consume most of the time in writing a small amount of data, whereas disk rotation and seek latency are comparatively insignificant when writing large amounts of data. Consider a situation where an application writes a small amount of data to a staging area (such as a log) for a primary volume, a replication facility begins network data transfer of that data to its replication target host (secondary node) concurrently with starting the local disk write of the same data to the primary volume, and then the replication facility waits for the secondary node to confirm that the same data have been written to disk prior to acknowledging completion of the write request to the application. The aggregate latency incurred in such a scenario is nearly the same as a situation where the application concurrently writes the small amount of data to two separate mirrored disks on the primary node because the rotational latency dominates the time required to perform the write operations on the primary node.

If the amount of data is large enough that the rotational latency is an insignificant component of the overall elapsed time for writing the data to disk, the data can be "streamed" over the network between the primary and secondary nodes in small amounts and written to the secondary nodes. This write strategy should achieve similar performance to that of local write operations to two mirrored disks. If the primary node concurrently facilitates network data transfer and remote disk writing in another way, then the total elapsed time for the I/O operation should be comparable to local writes of the data to two separate disks.

Aggregate network latencies depend on the stability, quality, and distance of data transfer. Data that are lost or corrupted due to an unreliable network must be resent across the network. Resends degrade the throughput of the network and greatly increase the latency of affected I/O operations. Efficiency of I/O operations is also affected by distance, as physics dictates that every 300 km in distance that data must travel adds over a millisecond to the transfer time of the data.

For the purposes of using replication as a technique for maintaining mirrored copies of primary data, better performance will result when the quality of the network and the distance between the primary and secondary nodes are constrained. The closer the primary and secondary nodes and the better the quality of the network, the closer the overall performance of the system will be to that of a single host writing multiple copies of the data to local storage.

Storage Organization and Management Considerations

Optimal storage organization on the primary and secondary nodes and intelligent storage management will enhance the performance of the system described herein in maintaining up-to-date, consistent, and secure copies of primary data. On the primary node, an important consideration is efficiently managing read and write operations. An example of an efficient write operation was described above with reference to FIG. 1B, where the change to the data was first written to a persistently-stored log and later asynchronously written from the log to permanent data storage. Writing the data to a log saves time in searching for the data in the permanent data storage.

Because the log is usually relatively small in comparison to the data storage itself, asynchronously writing data from the log to the permanent data storage can be performed relatively quickly without the need for complex tracking of in-progress operations that are necessary when writing directly to the primary data storage. Also, as mentioned above, the write operation can be considered completed when the data has been written to the local log and is known to have been committed to persistent data storage on the secondary node, without waiting for the local data volume to be updated. Writing to the log and transferring the data simultaneously across the network can be performed more quickly than a write operation performed directly to the data storage, due to the efficiencies of sequential I/O achieved using the log. For the most secure operation, a redundant copy of the log should be maintained.

When write operations are performed as described above, read operations are complicated by the fact that some of the primary data may be in the log and not yet written to permanent data storage. Reading data from the log can disrupt writing data to the log, which is undesirable. One way to minimize the disruption is to maintain a non-persistent index of data in the log and consult that index on every read operation to ascertain the location in the log from which to read the data.

Alternatively, reading from the log can be avoided altogether. For example, if the result of a write operation remains in the log for only a short time prior to being written to the permanent data volume, read operations can be briefly stalled until the data are written to the data volume. As another alternative, a copy of the log can be maintained in cache memory, and some portions of the data can be read from the cache memory, while other portions are read from the data volume. Yet another alternative can be used if the latency of writing data from the log to permanent data storage is unacceptably long compared to the latency of the original write operation into the log: delaying notification of the application that a write operation is completed. When notification is delayed, the application is less likely to attempt to read data that are still in the log and not yet on the data volume. If the application does issue a read operation for a block that is in the process of being written, permanent storage can be read to return the older version of the data or memory cache can be read to return the current version of the data. An application that issues conflicting read and write operations should recognize that data are likely to be incorrect and handle such a situation by re-reading the data.

Maintenance of Multiple Versions of the Data

A breach of security that enables primary data to be corrupted can result in replication of the corrupted primary data to all backup copies. Additional measures must be taken to ensure that valid and consistent primary data can be recovered when a discovery is made that the primary and backup data have been corrupted. Several techniques are available to preserve previous versions of the data or to enable the reconstruction of a valid version of the data.

These techniques include logging all changes to the known-to-be-stable copy of data without actually applying these changes to that stable copy and constructing a current version of the data from the log and the stable copy. Another technique includes using purely log-based storage such that changes to the data can be selectively applied when a current version of the data is constructed from the log. Yet another technique includes logging new data on the primary node in batches for periodic application to the remote copy and taking a snapshot of the remote copy before every batch update.

The primary and secondary data storage may be configured the same or differently. For example, each data storage area may be configured to store data only in a log; in a log combined with a storage volume; or in a log, storage volume, and a set of one or more snapshots. Preferably, at least the secondary node is configured to maintain multiple versions of the data.

Version management software or hardware. Research efforts to create "self-securing" storage have focused on systems and intelligent devices that store multiple versions of a given unit of data, such as a file or a block. Metadata are maintained for each unit of data to keep track of the versions of that unit of data. For example, if a block A in a file is overwritten, the new contents of the block A can be stored in a newly allocated block A', leaving the original block A intact. A unique identifier for the file that points to block A' rather than A is added to the time-ordered list of versions of the file. However, versioned storage systems and devices are a slower alternative to regular data storage, since metadata are written whenever the data changes. Metadata retrieval and/or update may be needed for every read and write operation if the I/O pattern is sufficiently random.

Data logs. Another approach to enable recovery of previous versions of valid primary data involves logging data on the remote node, as described with reference to FIG. 1B. Data are written to a log when received at the secondary node and a large number of log updates are maintained in a cache memory. Prior to writing the data from the log into permanent data storage, a snapshot of the permanent data storage is written, and then a cached version of the log data is used to update the permanent data storage. This technique lowers the latency of persistently storing data on the remote node because sequential I/O latency when writing data from the log cache is usually 7–8 times lower than random I/O latency. Furthermore, the cost of maintaining point-in-time copies of the data (snapshots) is lowered because snapshots are taken relatively infrequently.

If data are kept in the log as long as possible, the time ordering of operations is preserved, enhancing the ability to access the state of the data at various points in time. In addition, retaining data in the log eliminates the overhead inherent in very frequent updates to a small number of "hot" blocks with values that repeatedly change. However, a large amount of data in the log results in lengthy crash recovery start-up processing because either an index of the data locations must be constructed, or each entry has to be applied to the main storage volume and its snapshots.

Snapshots. Generally, a snapshot is a copy of data that captures a state of the data at a particular point in time. Various techniques for making "snapshots" of data are known in the art. One technique for creation of snapshots is performed by copying each block from the primary data volume to a corresponding block in a snapshot volume. Block-by-block copying is an expensive and time-consuming operation, however, and the snapshot volume is not available to provide all of the primary data for other operations until a copy of every block is made. Furthermore, access to the primary data on the primary volume is degraded during creation of the snapshot volume.

A technique has been developed for creating "instant" snapshots by Veritas Software Corporation of Mountain View, Calif., that enables both the primary volume and the snapshot volume to be immediately available for input/output operations after the snapshot is made. The instant snapshot volume typically is created as an empty storage object or by including only portions of the data from the primary volume. Other data from the primary volume can be copied in the background while I/O operations are performed on both the primary volume and the snapshot volume. If data are read that have not yet been copied to the snapshot volume, those data are either provided from the primary volume to the reader or first copied to the snapshot volume and then provided to the reader from the snapshot volume. Techniques for creating and using instant snapshots and performing other "instant" operations are described in U.S. patent application Ser. No. 10/143,059, entitled "Method and Apparatus for Creating a Virtual Data Copy," filed May 10, 2002, and naming as inventors Anand A. Kekre, John A. Colgrove, Oleg Kiselev, Ronald S. Karr, and Niranjan S. Pendharkar, the application being incorporated by reference herein in its entirety for all purposes.

A trade-off is made between the frequency and granularity of snapshots and the rate of recovery after a node failure. The less often snapshots are taken, the greater the amount of data that must be recovered and the slower the recovery. However, as the number of snapshots grows, additional data storage is required to store the snapshots and performance of I/O operations may suffer. As the length of time since a snapshot was taken grows, the probability of that snapshot being useful decreases. One management strategy is to eliminate older snapshots to save space. For example, if snapshots are taken every 5 minutes, after a few hours the older snapshots can be "collapsed" such that several temporally adjacent snapshots are combined (for example snapshots taken at 5, 10 and 15 minutes after the hour can be represented by one snapshot; snapshots taken at 20, 25, and 30 minutes after the hour can be represented by another snapshot, and so on). In this scenario, one synthetic snapshot combines data changes for each 15 minute interval (in this case, for 15 minutes after the hour, 30 minutes, 45 minutes and on the hour), reducing the number of snapshots. As the 15-minute snapshots become older than a day, they can be collapsed into hourly snapshots, and so on. The decision about the number and frequency of snapshots to retain must take into account the information and recovery needs of the organization.

In addition to the number of snapshots to be retained, a management decision must be made about the type(s) of snapshots to retain. One type of snapshot is a "full data" snapshot, in which a complete copy of every region of the corresponding storage volume is made. Another type of snapshot is a "copy-on-write" (COW) snapshot. In a copy-on-write snapshot, before an update to a region of the primary data is made, the previous data in the region is copied to a copy-on-write snapshot. The copy-on-write snapshot typically contains only data for regions that change and is combined with the unchanged regions of the primary volume to provide a complete image of a previous state of the data. This scheme has an advantage that when the oldest snapshots need to be eliminated, no data must be moved from one location to another and the old copy-on-write snapshots can simply be deleted. One disadvantage is that the copy-on-write process is expensive because additional I/O operations are required for every write operation.

Another type of snapshot is referred to as an "overlay" snapshot. Changes to data are written to an empty overlay storage object, and the previous version of the data remains unchanged in the main storage volume. In effect, because the main storage volume does not change, the main storage volume serves as a point-in-time snapshot of the data. This point-in-time snapshot of the main storage volume is combined with one or more overlay storage objects to create a virtual image of the data, which can be referred to as an "overlay snapshot." Note that an overlay snapshot does not physically exist in one data storage location, but rather is constructed as a virtual image when needed. This technique enables the integrity of an earlier image of the data to be preserved, while allowing fast write operations. Multiple overlay storage objects can be created to capture the state of the data in the main storage volume at different points in time.

Figure 2:
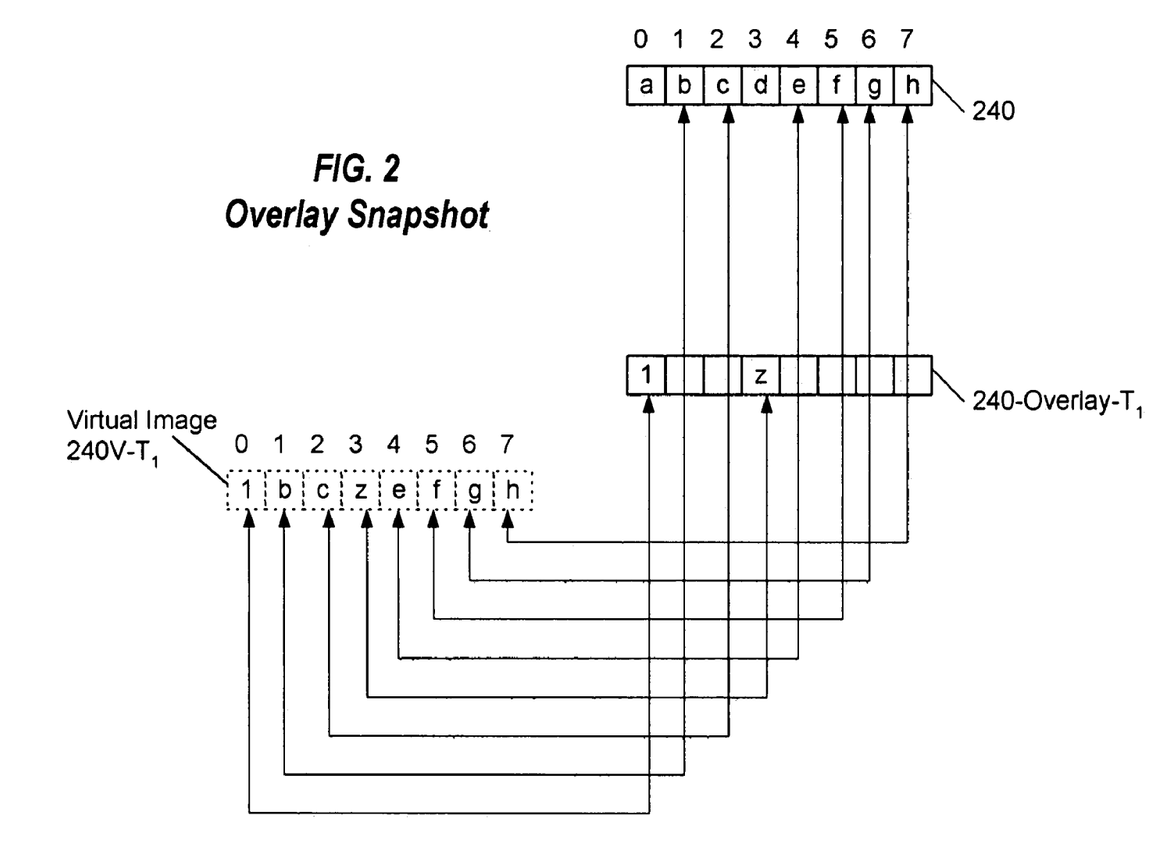
FIG. 2 shows an example of an overlay storage object and underlying data volume and construction of a virtual image of the data.

FIG. 2 shows an example of an overlay storage object and underlying data volume and construction of a virtual image of the data. Data volume 240 is shown at time $T_0$, having eight regions, labeled regions 0 through 7, with each region containing a one-character data value, here 'a' through 'g.' An overlay storage object at time $T_0$ (not shown) is empty. One of skill in the art will recognize that a physical device may be organized into units other than regions and that a unit of storage, such as a region, will correspond to a set of data, such as a 512-byte block, rather than a single character.

After time $T_0$, data having a value of 'x' are written to region 0, data having a value of 'z' are written to region 3, and data having a value of '1' are written to region 0 (overwriting the previously-written value of 'x'). Overlay storage object 240-Overlay-$T_1$ shows a value of '1' in region 0 and a value of 'z' in region 3 at time $T_1$; data volume 240 has not changed. Virtual image 240V-$T_1$ shows values for the set of data as constructed from overlay storage object 240B-Overlay-$T_1$ regions 0 and 3 and base volume 240 regions 1, 2, and 4–7. Resulting virtual image 240V-$T_1$ has values-'1', 'b', 'c', 'Z', 'e', 'f', 'g', and 'h' in regions 0 through 7.

With overlay storage objects, write operations are relatively inexpensive, because no data must be copied to preserve a previous version of the data. However, metadata indicating the location of the data must be recorded. Often metadata indicating the locations of current data for each region are tracked in the form of a bitmap. In the bitmap, each bit represents one region of the data and the bit value indicates whether the current data for the region are in the main storage volume or in an overlay storage object. Such metadata may be stored in other forms, such as a table or list of locations for each region, although bitmaps enable easy manipulation of the location information.

Furthermore, with overlay storage objects, read operations must determine the locations from which to read current data. In some implementations, when a read operation is to take place, data are moved from the overlay storage object(s) to the main storage volume. This data transfer can be relatively expensive when large amounts of data must be transferred. However, if the new write operations are logged to a separate device dedicated to storing the overlay storage object, no conflicting operations will interfere with retrieval and transfer of the data from the overlay storage object.

Storage space for snapshots can be allocated in several ways. For example, when a snapshot is created, storage space can be allocated in the snapshot to store each block of the corresponding storage volume. This technique reserves space in advance so that I/O operations can proceed without the need to acquire storage space to store the result. However, for very large storage volumes, much of the pre-allocated space may be unused. Another technique is to dynamically allocate the space needed for each I/O operation to the snapshot, which requires additional overhead for I/O operations but more efficiently uses storage space. Such snapshots are known as "space-optimized" snapshots. These storage space allocation techniques are known in the art.

Space-optimized snapshots are sometimes referred to as "cache-structured" snapshots because the data are organized for efficient use of space. In storing data in a cache-structured snapshot, a cache manager stores the data in a layout that efficiently stores data rather than using a strict logical-to-physical address translation. A mapping is used to track correspondence between the logical region of the data to the physical region of the underlying physical storage device. Upon responding to a read request, the cache manager uses the mapping identify the physical region of the storage device from which to read data for a given logical address, rather than performing a simple address translation to obtain the physical address.

Another important consideration in managing backup versions of the primary data is that an increase in a number of devices increases the probability of failure of at least one of these devices. With copy-on-write snapshots, the probability of losing the current version of the data remains the same as the probability of losing the primary volume itself. However, the probability of losing at least one of the snapshots of previous versions of the data increases with the number of devices storing snapshots. With overlay storage objects, failure of any one device may cause the loss of integrity of the current version of the data; for example, with reference to FIG. 2, failure of the device storing overlay storage object 240-Overlay-$T_1$ will cause the current version of the data (shown in virtual image 240V-$T_1$) to be lost. This effect of lowered reliability can be ameliorated by mirroring the storage used for overlay storage objects.

In addition to taking multiple snapshots of one set of data at different points in; time, snapshots of snapshots can be made. Furthermore, changes can be independently written to snapshots, creating a "hierarchy" of snapshots of the data, as described in U.S. patent application Ser. No. 10/610,603, client reference VRTS 0073), filed on Jul. 1, 2003, entitled "Flexible Hierarchy of Relationships and Operations in Data Volumes," and naming as inventors Anand A. Kekre, John A. Colgrove, Oleg Kiselev, Ronald S. Karr, and Niranjan S. Pendharkar, the application being incorporated by reference herein in its entirety and for all purposes. Snapshots to which changes can be independently written are referred to herein as "writeable snapshots." A snapshot made to preserve a version of the data as of a given point in time, and to which data are not later written, is referred to herein as a "point-in-time snapshot."

Figure 3A:
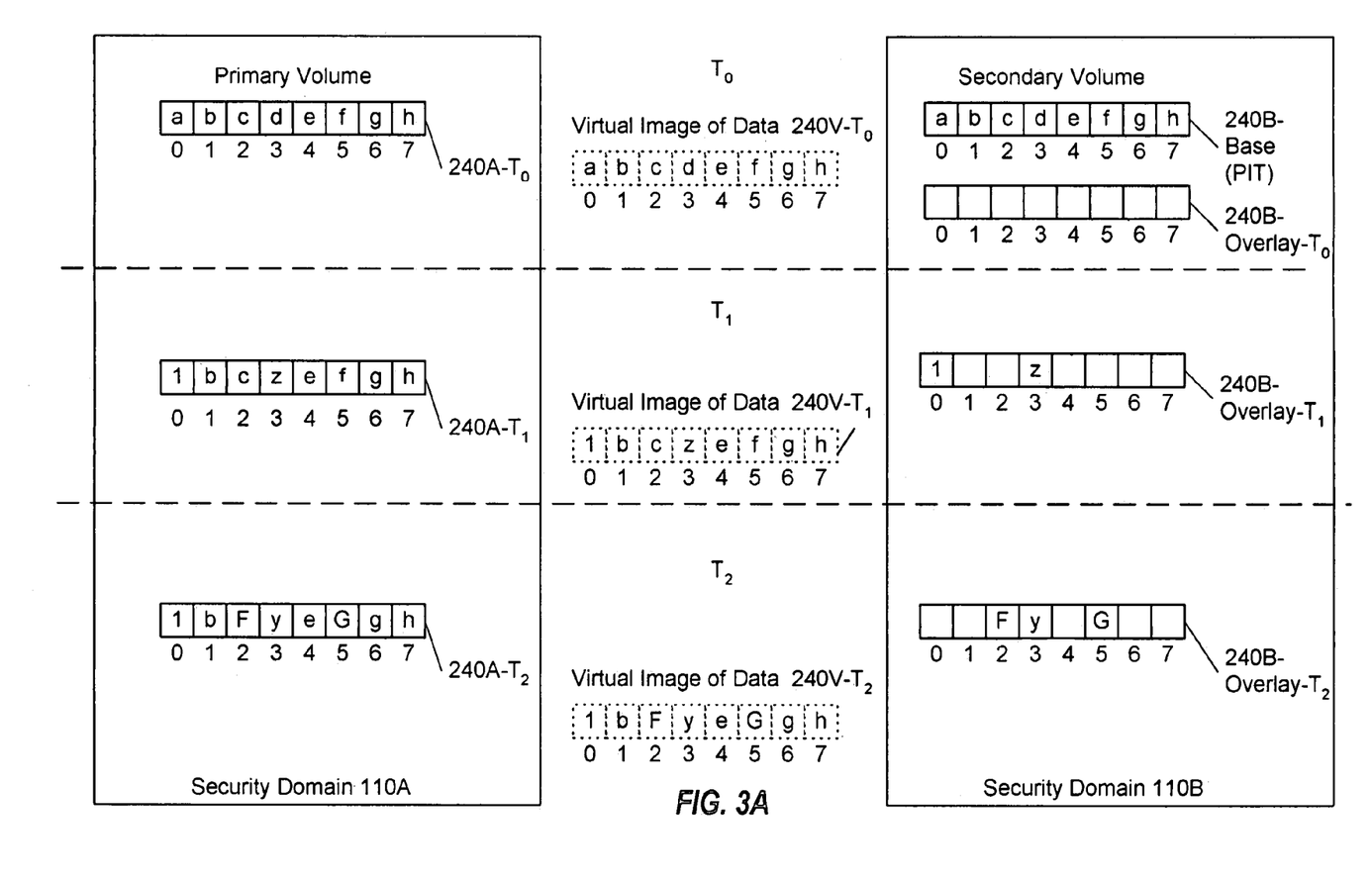
FIG. 3A shows an example of several instances of primary and secondary data at different points in time when maintained in accordance with one embodiment of the present invention.

FIG. 3A shows an example of several instances of primary and secondary data at different points in time when maintained in accordance with one embodiment of the present invention. Each of security domain 110A and security domain 1110B shows copies of a set of data at times $T_0$, $T_1$, and $T_2$. Data for secondary volume 240B at time $T_0$ is shown in the form of an empty overlay storage object 240-Overlay-$T_0$ and base volume 240B-Base(PIT), although one of skill in the art will recognize that other forms of storage may be used for secondary volumes, such as copy-on-write snapshots, full data snapshots, and so on. Primary volume 240A-$T_0$ and secondary volume 240B (as represented by virtual image 240V-$T_0$) are identical at time $T_0$, having values 'a' through 'g' in regions 0 through 7. Point-in-time snapshot volume 240B-Base(PIT) is made to preserve the state of the data at time $T_0$ and serves as the base volume for overlay storage objects at times $T_0$, $T_1$, and $T_2$.

Changes between time $T_0$ and $T_1$ are the same as those described with reference to FIG. 2. After time $T_0$, data having a value of 'x' are written to region 0, data having a value of 'z' are written to region 3, and data having a value of '1' are written to region 0 (overwriting the previously-written value of 'x'). Primary volume 240A-T, shows values '1', 'b', 'c', 'z', 'e', 'f', 'g', and 'h' in regions 0 through 7. Virtual image 240V-$T_1$ shows values for the set of data as constructed from overlay storage object 240B-Overlay-$T_1$ and base volume 240B-Base(PIT), also including values '1', 'b', 'c', 'z', 'e', 'f', 'g', and 'h' in regions 0 through 7. Construction of overlay storage object 240B-Overlay-$T_1$ was described with reference to FIG. 2. If primary volume 240A-$T_1$ were to fail at time $T_1$, read operations could be redirected to read from secondary security domain 110B by, for example, requesting data from a host controlling access to security domain 110B. While read operations would be less efficient, requiring reconstruction of virtual images such as virtual image 240V-$T_1$, operations could proceed until the underlying volume was available again.

After time $T_1$, data having a value of 'F' are written to region 2, data having a value of 'y' are written to region 3, and data having a value of 'G' are written to region 5. Primary volume 240A-$T_2$ shows values '1', 'b', 'F', 'y', 'e', 'G', 'g', and 'h' in regions 0 through 7. Virtual image 240V-$T_2$ shows values for the set of data as constructed from the layered set of snapshots including overlay storage object 240B-Overlay-$T_2$, overlay storage object 240B-Overlay-$T_1$, and base volume 240B-Base(PIT). Virtual image 240V-$T_2$ also includes values '1', 'b', 'F', 'y', 'e', 'G', 'g', and 'h' in regions 0 through 7. When multiple overlay storage objects are used, current data for a region of the data storage are read from the most recent overlay storage object that has data for that region. If none of the multiple overlay storage objects has data for a given region, that region's data are read from the underlying data volume, which serves as a point-in-time snapshot. Assume that a discovery is made that the write operations after time $T_1$ corrupted the primary data, and a decision is made to restore the primary data to the state that existed at time $T_1$.

Figure 3B:
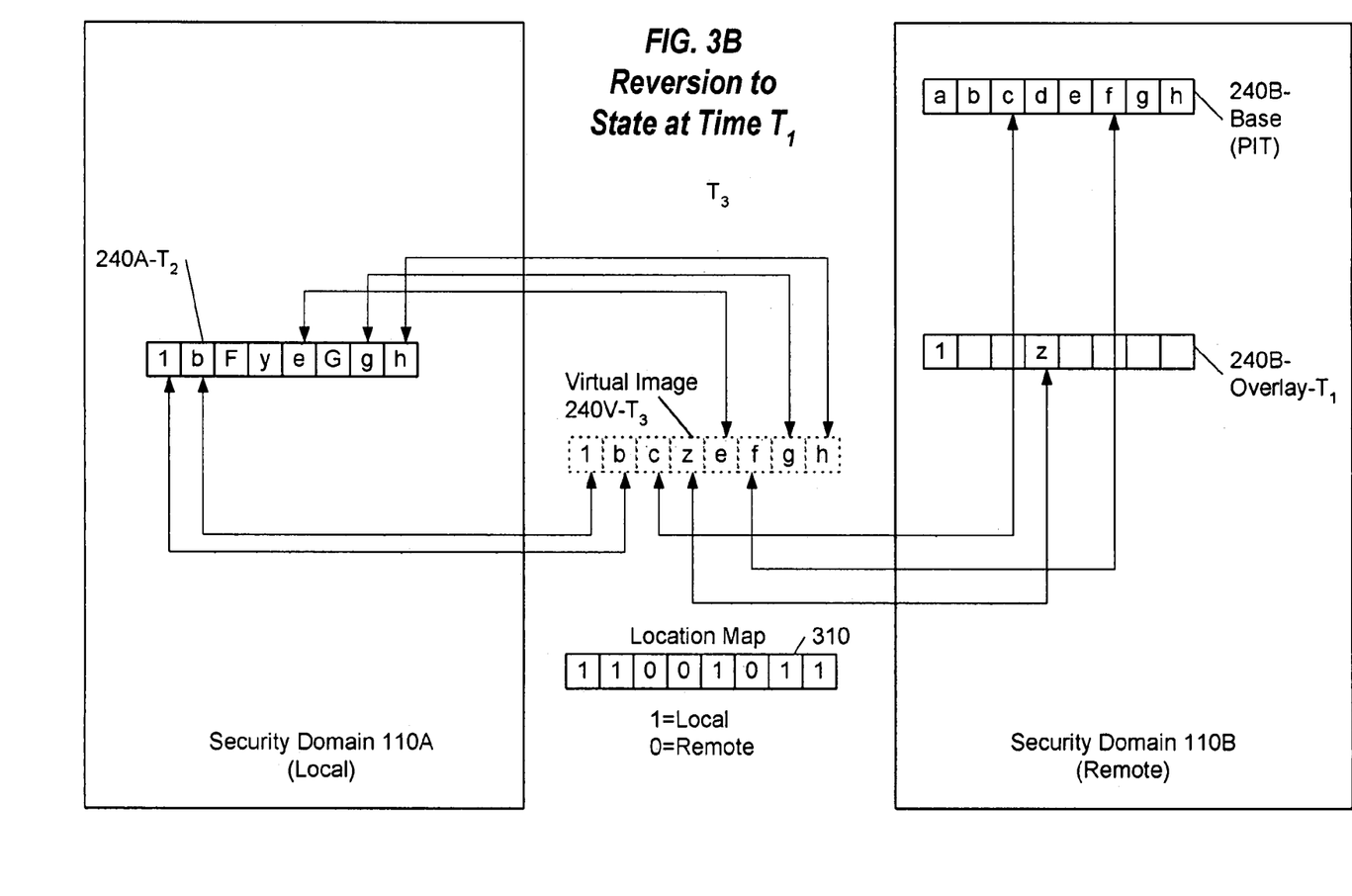
FIG. 3B shows an example of the data produced when reconstructing primary data from the data of FIG. 2 after discovery that a portion of the primary data is corrupted.

FIG. 3B shows an example of the data produced when reconstructing primary data from the data of FIG. 2 after discovery that a portion of the primary data is corrupted. Virtual image $240V\text{-}T_3$ can be constructed from the hierarchy represented by overlay storage object $240B\text{-}Overlay\text{-}T_1$ and base snapshot 240B-Base(PIT), as described with reference to FIG. 2.

For efficiency purposes, however, it is desirable to reconstruct virtual image $240V\text{-}T_3$ using data from primary volume $240A\text{-}T_2$ if possible, since not all data on the primary volume were corrupted. Location map 310 can be constructed to identify the locations of valid data for each region at time $T_3$. Between times $T_{1\ and\ T2}$, data were written to regions 2, 3 and 5. This information can be obtained, for example, from a bitmap associated with overlay storage object $240B\text{-}Overlay\text{-}T_2$ or from the log used to update either primary volume $240A\text{-}T_2$ or secondary volume $240B\text{-}T_2$. Changes made between times $T_{1\ and\ T2}$ are to be "backed out," which can be accomplished by using data for regions 2, 3 and 5 from the remote security domain 110B. Location map can contain values of '0' for regions 2, 3, and 5, indicating that those data values are to be obtained from the remote security domain 110B. To read those values from remote security domain 110B, a storage manager/replicator, such as storage manager/replicator 120A in security domain 110A of FIG. 1A, would request a corresponding storage manager/replicator having access to security domain 110B to provide those data values. Other values can be read from primary volume $240A\text{-}T_2$, as indicated by the values of '1' for regions 0, 1, 4, 6, and 7 in location map 310.

Data for region 3 is valid in overlay storage object $240B\text{-}Overlay\text{-}T_1$, and data for regions 2 and 5 have not changed since base snapshot 240B-Base(PIT) was made. These data for regions 2, 3, and 5 from the remote security domain 110B are then combined with the unchanged data from regions 0, 1, 4, 6, and 7 in primary volume $240A\text{-}T_2$ to form virtual image $240V\text{-}T_3$. Virtual image $240V\text{-}T_3$ can then be used to restore the data in primary volume 240A.

In the example of FIG. 3B, point-in-time snapshots are created and managed on a secondary node in security domain 110B. One management decision when maintaining point-in-time snapshots is whether to create them on the primary node, secondary node, or both. If point-in-time snapshots are created and managed on the primary node, recovery of a previous version of the data is faster because data need not be transferred across the network or replication link. However, point-in-time snapshots on the primary node are vulnerable to breaches of security in the primary node. In most cases, damaging some easily-identifiable index and map data stored on the disks is sufficient to render the snapshots unusable.

Furthermore, maintaining point-in-time snapshots diverts resources from maintaining the primary data itself. Creation of snapshots requires auxiliary I/O operations to update snapshot maps and/or metadata. Snapshots also increase the amount of data in primary data storage, which degrades the overall I/O performance of the primary node. Furthermore, presumably, snapshots will be replicated along with the primary data, increasing the amount of data traveling over the replication link.

Creating point-in-time snapshots on the remote node offloads some of the maintenance burden from the primary node, but accessing the point-in-time snapshots requires data movement from the remote to the primary node. One management solution may be to perform all read operations on the primary node and to dedicate remote node resources to maintaining backup copies and point-in-time snapshots. Other implementations may maintain point-in-time snapshots on both the primary and secondary nodes. Preferably, a sufficient number of point-in-time snapshots, is made to enable the ability to recover the primary data as it existed at several recent points in time.

Failure Scenarios

Upon failure of the primary node, the application managing the primary data can resume operation on the secondary node, although the mirroring scenario described herein is designed for ensuring data correctness and recoverability rather than for business continuity. The rapid recovery provided by maintaining a secure, up-to-date, and consistent version of the primary data enables operations to be restored as soon as the primary node can be made available.

Failure of the secondary node can be treated much like a local mirror failure due to a local disk crash. By keeping track of changes made to the primary data while the secondary node is down, the remote data copy can be synchronized with the primary data as soon as the secondary node is available.

Disk failure handling on the primary node is somewhat different from a disk failure in a local mirroring scenario. One preventative measure to address this situation is to have the local storage on the primary node mirrored at the hardware or software level. This approach makes the local disk failure purely the domain of the traditional storage manager recovery processing, invisible to the replication and to the storage consumers, except as possible performance degradation during the recovery.

When all storage on the primary node fails, data storage on the remote node can be accessed by requesting the data from the remote host until storage on the primary node can be used and data restored. Performance of read and write operations will suffer due to the need to transfer data across the network, but systems can remain operational until storage can be accessed on the primary node. Preferably, a system using the remote mirroring configuration described herein includes redundant storage of primary data to minimize the need to read from remote data storage.

The system can be configured to perform restoration of data from the remote data storage to primary data storage in the background until the primary data are restored, and then to discontinue accessing data on the remote node. In such a situation, read operations from the remote data can be treated as higher priority I/O operations, and the transfer of restored data can be opportunistic and scheduled for transfer accordingly. It may be possible to take advantage of reads of the remote data to pick up data that need to be restored without an additional transfer. Preferably, any regions recovered opportunistically can be tracked to avoid needless duplication of data access and transfer.

When data are recovered from a previous version of the data, the system can be configured to perform iterative recovery attempts. For example, different images of the data can be restored from snapshots representing various points in time and tested for acceptability without overwriting the primary data. The history of corruption can be investigated directly, write by write, and a "best" version of the data can be selected for restoration of the primary storage volume.

An Example Computer System

Figure 4:
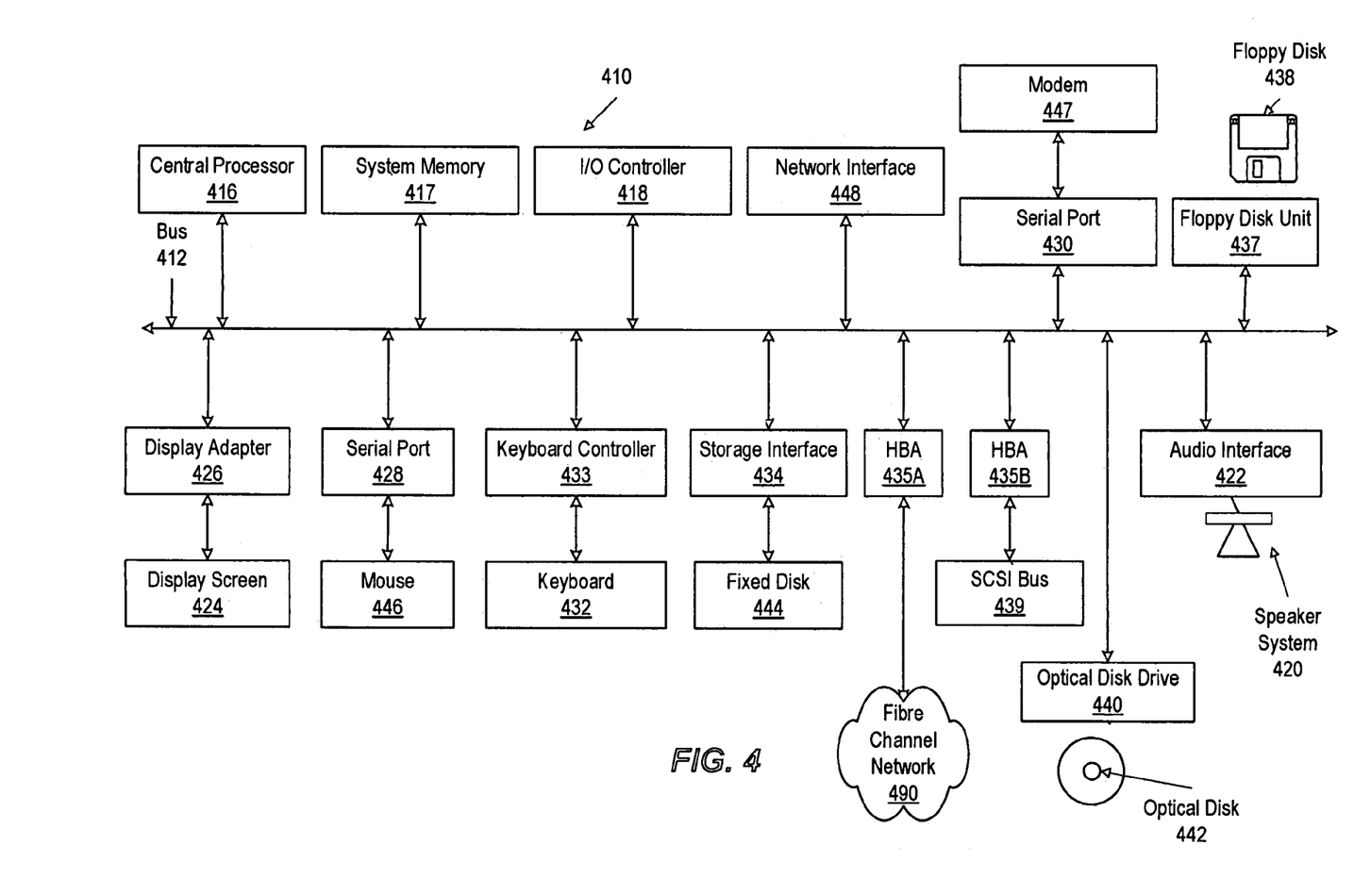
FIG. 4 is an example configuration of a computer system that can be used to operate the present invention.

FIG. 4 depicts a block diagram of a computer system 410 suitable for implementing the present invention. Computer system 410 includes a bus 412 which interconnects major subsystems of computer system 410, such as a central processor 416, a system memory 417 (typically RAM, but which may also include ROM, flash RAM, or the like), an input/output controller 418, an external audio device, such as a speaker system 420 via an audio output interface 422, an external device, such as a display screen 424 via display adapter 426, serial ports 428 and 430, a keyboard 432 (interfaced with a keyboard controller 433), a storage interface 434, a floppy disk drive 437 operative to receive a floppy disk 438, a host bus adapter (HBA) interface card 435A operative to connect with a fibre channel network 490, a host bus adapter (HBA) interface card 435B operative to connect to a SCSI bus 439, and an optical disk drive 440 operative to receive an optical disk 442. Also included are a mouse 446 (or other point-and-click device, coupled to bus 412 via serial port 428), a modem 447 (coupled to bus 412 via serial port 430), and a network interface 448 (coupled directly to bus 412).

Bus 412 allows data communication between central processor 416 and system memory 417, which may include read-only memory (ROM) or flash memory (neither shown), and random access memory (RAM) (not shown), as previously noted. The RAM is generally the main memory into which the operating system and application programs are loaded and typically affords at least 64 megabytes of memory space. The ROM or flash memory may contain, among other code, the Basic Input-Output system (BIOS) which controls basic hardware operation such as the interaction with peripheral components. Applications resident with computer system 410 are generally stored on and accessed via a computer readable medium, such as a hard disk drive (e.g., fixed disk 444), an optical drive (e.g., optical drive 440), floppy disk unit 437 or other storage medium. Additionally, applications may be in the form of electronic signals modulated in accordance with the application and data communication technology when accessed via network modem 447 or interface 448.

Storage interface 434, as with the other storage interfaces of computer system 410, may connect to a standard computer readable medium for storage and/or retrieval of information, such as a fixed disk drive 444. Fixed disk drive 444 may be a part of computer system 410 or may be separate and accessed through other interface systems. Modem 447 may provide a direct connection to a remote server via a telephone link or to the Internet via an internet service provider (ISP). Network interface 448 may provide a direct connection to a remote server via a direct network link to the Internet via a POP (point of presence). Network interface 448 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 4 to be present to practice the present invention. The devices and subsystems may be interconnected in different ways from that shown in FIG. 4. The operation of a computer system such as that shown in FIG. 4 is readily known in the art and is not discussed in detail in this application. Code to implement the present invention may be stored in computer-readable storage media such as one or more of system memory 417, fixed disk 444, optical disk 442, or floppy disk 438. Additionally, computer system 410 may be any kind of computing device, and so includes personal data assistants (PDAs), network appliances, X-window terminals or other such computing devices. The operating system provided on computer system 410 may be MS-DOS®, MS-WINOWS®, OS/2®, UNIX®, Linux®, or another known operating system. Computer system 410 also supports a number of Internet access tools, including, for example, an HTTP-compliant web browser having a JavaScript interpreter, such as Netscape Navigator®, Microsoft Explorer®, and the like.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention.

Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
replicating an operation on data from first data storage in a first security domain to second data storage in a second security domain, wherein
the first security domain and the second security domain are independent of one another,
the first security domain permits a first host in the first security domain to directly access the first data storage, and
the first security domain prohibits a second host in the second security domain from directly accessing the first data storage;
awaiting a receipt of an acknowledgement that the operation on the data has been completed in the second security domain; and
completing the operation on the data in the first security domain in response to the receipt of the acknowledgement that the operation on the data has been completed in the second security domain, wherein the completing the operation in the second security domain comprises completing the operation on the data in second data storage in the second security domain.

2. The method of claim 1 wherein
the replicating is performed over a controlled communication link from the first host in the first security domain to the second host in the second security domain.

3. The method of claim 2 wherein
only the controlled communication link couples the first host to the second host.

4. The method of claim 1 wherein
the first host controls access to the first security domain; and
the second host controls access to the second security domain.

5. The method of claim 4 further comprising:
the first host accessing data stored in the second security domain by requesting the data stored in the second security domain from the second host.

6. The method of claim 4 wherein
the second data storage is inaccessible directly by the first host.

7. The method of claim 4 wherein
the first data storage is inaccessible directly by the second host.

8. The method of claim 1 wherein
the completing the change comprises
notifying an application making the change to the data that the change is complete.

9. The method of claim 1 further comprising:
using the data from the second data storage when the first data storage fails.

10. The method of claim 1 further comprising:
reading a first portion of the data from the first data storage; and
requesting a second portion of the data from the second host coupled to the second data storage.

11. The method of claim 1 wherein
the first data storage and the second data storage are not connected to one local area network.

12. The method of claim 1 further comprising:
replicating a second change to the data in the first data storage to the second security domain after the acknowledgement is received.

13. The method of claim 12 further comprising:
completing the second change in the first security domain when a second acknowledgement is received that the second change to the data has been stored in the second storage area.

14. The method of claim 1 further comprising:
restoring the data in the first data storage from the second data storage when the data are corrupted.

15. The method of claim 1 wherein
the first data storage comprises a log.

16. The method of claim 1 further comprising:
saving a version of data stored in the second data storage prior to storing the change to the data in the second data storage.

17. The method of claim 16 wherein
both the version of the data and the change to the data are accessible after storing the change to the data in the second data storage.

18. The method of claim 1 wherein
the second data storage comprises a log.

19. The method of claim 18 further comprising:
constructing a current version of the data from the log.

20. The method of claim 1 wherein
the second data storage comprises
a log, and
a storage volume.

21. The method of claim 20 further comprising:
writing the change to the data to the log; and
writing the change to the data from the log to the storage volume.

22. The method of claim 21 further comprising:
allocating space in the second data storage for the change to the data when writing the change to the data from the log to the storage volume.

23. The method of claim 20 further comprising:
writing an oldest change to the data from the log to the storage volume.

24. The method of claim 1 wherein
the second data storage comprises
a log,
a storage volume, and
a set of snapshots of the storage volume.

25. The method of claim 24 further comprising:
periodically making a new snapshot of the set of snapshots.

26. The method of claim 25 further comprising:
allocating a portion of the second data storage for storing the new snapshot when the new snapshot is made.

27. The method of claim 26 wherein
the portion comprises storage for each block of a plurality of blocks in the storage volume.

28. The method of claim 24 wherein
at least one of the set of snapshots is a copy-on-write snapshot.

29. The method of claim 28 wherein
the copy-on-write snapshot is a most recent snapshot of the set of snapshots.

30. The method of claim 28 further comprising:
writing the change to the log,
writing a version of data in the storage volume to the copy-on-write snapshot, and writing the change to the data to the storage volume after writing the version of the data to the copy-on-write snapshot.

31. The method of claim 24 wherein
at least one of the set of snapshots is an instant snapshot.

32. The method of claim 24 further comprising:
combining data from at least two snapshots of the set of snapshots into a combined snapshot; and
deleting the at least two snapshots.

33. The method of claim 32 wherein
the at least two snapshots were created at adjacent points in time.

34. The method of claim 1 wherein
the second data storage comprises
  a log,
  a storage volume, and
  a set of overlay storage objects, wherein
    each overlay storage object of the set comprises respective data to be applied to the storage volume.

35. The method of claim 34 further comprising:
writing the change to the data to the log;
writing the change to the data from the log to one overlay storage object of the set.

36. The method of claim 35 wherein
the one overlay storage object is a most recent overlay storage object of the set.

37. The method of claim 34 further comprising:
reading data in the second data storage by
  reading the respective data from at least one overlay storage object of the set of overlay storage objects, and
  reading other data in the second data storage from the storage volume.

38. The method of claim 37 wherein
the reading the respective data comprises reading the respective data in an order determined by a respective time for that each overlay storage object was created.

39. The method of claim 34 further comprising:
writing the respective data from one overlay storage object of the set of overlay storage objects to the storage volume.

40. The method of claim 39 wherein
the one overlay storage object is an oldest overlay storage object of the set.

41. The method of claim 39 further comprising:
deleting the one overlay storage object.

42. A system comprising:
means for replicating an operation on data from first data storage in a first security domain to second data storage in a second security domain, wherein
  the first security domain and the second security domain are independent of one another,
  the first security domain permits a first host in the first security domain to directly access the first data storage, and
  the first security domain prohibits a second host in the second security domain from directly accessing the first data storage;
means for awaiting a receipt of an acknowledgement that the operation on the data has been completed in the second security domain; and
means for completing the operation on the data in the first security domain in response to the receipt of the acknowledgement that the operation on the data has been completed in the second security domain, wherein the completing the operation in the second security domain comprises completing the operation on the data in second data storage in the second security domain.

43. The system of claim 42 wherein
the means for replicating is configured to perform the replicating of the operation over a controlled communication link from the first host in the first security domain to the second host in the second security domain.

44. A system comprising:
a replication module configured to replicate an operation on data from first data storage in a first security domain to second data storage in a second security domain, wherein
  the first security domain and the second security domain are independent of one another,
  the first security domain permits a first host in the first security domain to directly access the first data storage, and
  the first security domain prohibits a second host in the second security domain from directly accessing the first data storage;
a receiving module configured to await a receipt of an acknowledgement that the operation on the data has been completed in the second security domain; and
a completion module configured to complete the operation on the data in the first security domain in response to the receipt of the acknowledgement that the operation on the data has been completed in the second security domain, wherein the completing the operation in the second security domain comprises completing the operation on the data in second data storage in the second security domain.

45. The system of claim 44 wherein
the replication module is configured to perform the replication over a controlled communication link from the first host in the first security domain to the second host in the second security domain.

46. The system of claim 44 further comprising:
a secondary module configured to use the data from the second data storage when the first data storage fails.

47. The system of claim 44 further comprising:
a reading module configured to read a first portion of the data from the first data storage; and
a requesting module configured to request a second portion of the data from the second host coupled to the second data storage.

48. The system of claim 44 further comprising:
a restoring module configured to restore the data in the first data storage from the second data storage, if the data becomes corrupted.

49. A computer-readable medium comprising:
replicating instructions configured to replicate an operation on data from first data storage in a first security domain to second data storage in a second security domain, wherein
  the first security domain and the second security domain are independent of one another,
  the first security domain permits a first host in the first security domain to directly access the first data storage, and the first security domain prohibits a second host in the second security domain from directly accessing the first data storage;

awaiting a receipt of an acknowledgement that the operation on the data has been completed in the second security domain; and completing instructions configured to complete the operation on the data in the first security domain in response to the receipt of the acknowledgement that the operation on the data has been completed in the second security domain, wherein the completing the operation in the second security domain comprises completing the operation on the data in second data storage in the second security domain.

50. The computer-readable medium of claim 49 wherein the replicating instructions are configured to perform the replication over a controlled communication link from the first host in the first security domain to the second host in the second security domain.

51. The computer-readable medium of claim 49 further comprising:

using instructions configured to use the data from the second data storage when the first data storage fails.

52. The computer-readable medium of claim 49 further comprising:

reading instructions configured to read a first portion of the data from the first data storage; and requesting instructions configured to request a second portion of the data from the second host coupled to the second data storage.

53. The computer-readable medium of claim 49 further comprising:

restoring instructions configured to restore the data in the first data storage from the second data storage, if the data becomes corrupted.

\* \* \* \* \*